Jan. 24, 1961   B. B. BROOKHYSER ET AL   2,969,095
FEEDING APPARATUS FOR ROTARY WOOD FLAKER
Filed Aug. 30, 1957   3 Sheets-Sheet 1

INVENTORS
BYRON B. BROOKHYSER
HAROLD E. ERICKSON
DALE L. SCHUBERT
BY Eugene D. Farley
ATTY.

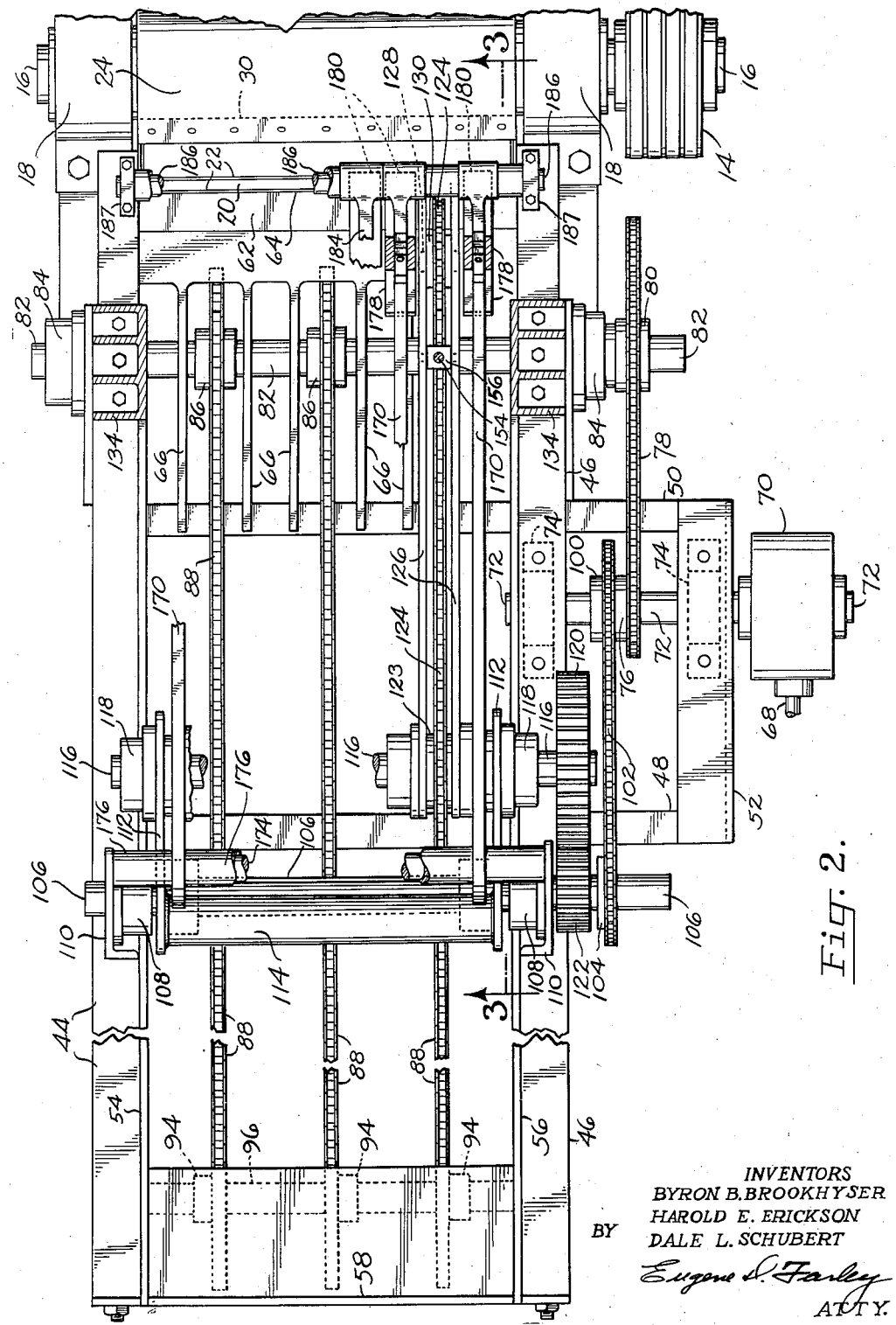

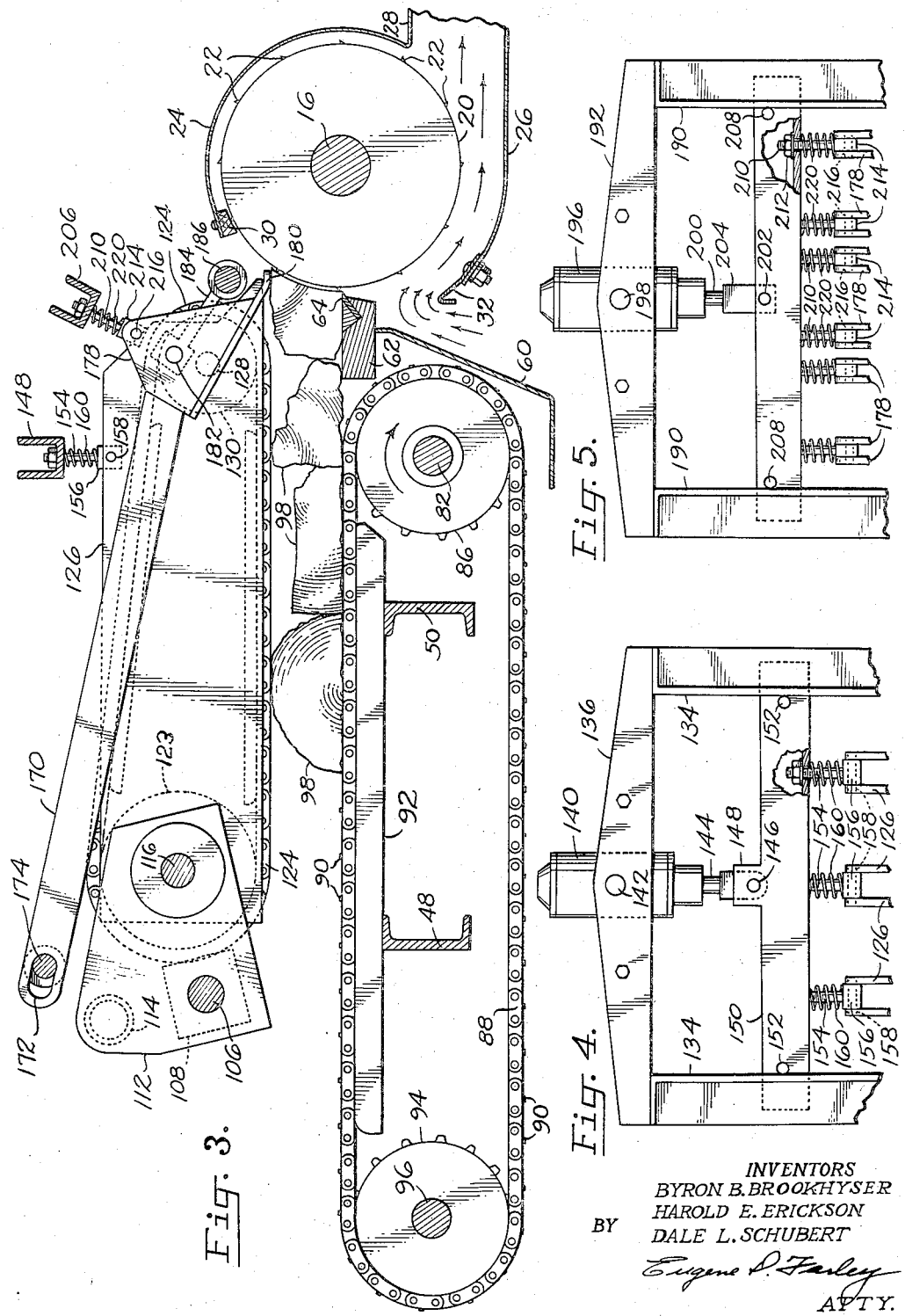

2,969,095
FEEDING APPARATUS FOR ROTARY WOOD FLAKER

Byron B. Brookhyser, Milton, Harold E. Erickson, Auburn, and Dale L. Schubert, Tacoma, Wash.; said Brookhyser and said Erickson assignors, by direct and mesne assignments, of one-sixth to said Schubert and three-sixths to Industrial Development Co., Tacoma, Wash., a corporation of Washington Filed Aug. 30, 1957, Ser. No. 681,339

10 Claims. (Cl. 144—242)

This invention relates to feeding apparatus for rotary wood flakers of the class employed for reducing wood to the form of flakes suitable for use in the production of hardboard and other composite wood products.

In the production of composition wood products such as hardboard it is desirable to employ as a basic raw material wood flakes prepared by cutting wood across the grain with a rotary cutter. In order to produce products of optimum properties, it is necessary that the flakes employed in their production have dimensions which are controlled within limits, and which are free from sticks, slivers and shives. Otherwise, the composition products made from the flakes are deficient in strength, of non-uniform density, and of inferior appearance.

It is the general object of the present invention to provide feeding apparatus which when used in conjunction with a rotary flaker will result in the production of wood flakes having uniform, controlled dimensions even though the wood being fed to the flaker comprises scrap material including slabs, irregular chunks, sawmill waste blocks, logs and the like.

It is also an object of the present invention to provide a feeding apparatus for rotary wood flakers which holds the wood securely as it is fed to the flaker, even though the pieces are of random size and shape. Still another object of the present invention is the provision of feeding apparatus for a rotary wood flaker which makes possible a greatly increased rate of flake production.

The manner in which the foregoing and other objects of this invention are accomplished will be apparent from the accompanying specification and claims considered together with the drawings, wherein like numerals of reference indicate like parts, and wherein:

Fig. 2 is a plan view thereof;

Fig. 3 is a sectional view taken along line 3—3 of Fig. 2;

Fig. 4 is a fragmentary view in front elevation looking in the direction of the arrows of line 4—4 of Fig. 1; and Fig. 5 is a fragmentary view in front elevation looking in the direction of the arrows of line 5—5 of Fig. 1.

Figure 1:
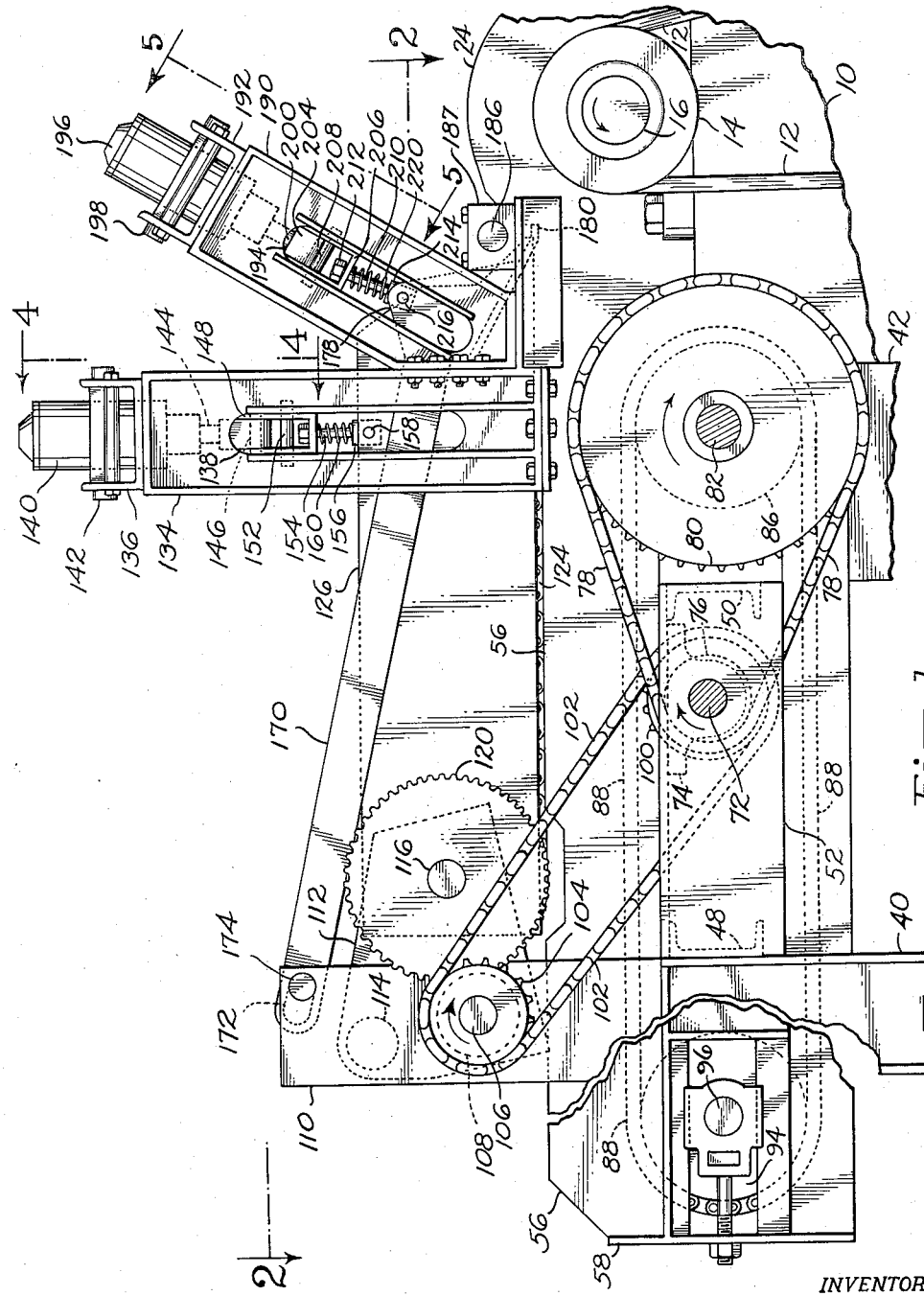
Fig. 1 is a view in side elevation of the presently described feeding apparatus.

In general, the apparatus of our invention for feeding wood blocks to a rotary wood flaker comprises lower conveying means, upper conveying means spaced vertically above the lower conveying means and cooperating with the same in conveying against the flaker blocks introduced between the conveying means and engaged thereby, mounting means for mounting the upper conveyor means for floating movement to accommodate wood blocks of random thickness, and a plurality of hold down members positioned above the outfeed end of the lower conveying means for bearing against the blocks and holding them down as they are reduced by the flaker. Means also are included for mounting the hold down members in such a manner that their forward ends very closely approach the flaker periphery and describe an arc which is concentric therewith, as they move from position to position with passage of the wood feed beneath them. As a consequence, each block is held securely until it is reduced substantially completely to the form of flakes, even though the blocks vary substantially in thickness.

Considering the foregoing in greater detail and with particular reference to the drawings:

The flaking assembly

The feeding apparatus of our invention is designed for use with a rotary wood flaker such as is illustrated particularly in Figs. 1 and 3. The flaker is mounted on a frame 10 and is driven at a suitable rotational speed through belt 12 by a motor not illustrated. This belt engages a pulley 14 keyed to a shaft 16 journaled in bearings 18.

A rotary cutter head 20 is mounted on the shaft. It may be of conventional construction and includes a plurality of spaced rows of knives 22 which may either be staggered from row to row or separated by scoring points in well known manner to cut away flakes of the desired width from wood blocks fed against them.

To enable fractionating and collecting the flakes cut by cutter head 20, the entire head preferably is encased in a housing, the upper member of which is indicated at 24, and the lower member at 26. These two members communicate with a conduit 28 which in turn communicates with a source of negative air pressure of sufficient capacity to create a substantial flow of air through the housing and conduit.

A wood bar 30 is bolted to the outer end of upper housing member 24 and forms an air seal. An angularly bent plate 32 is bolted to the outer end of lower housing member 26. The bolts preferably extend through registering slots in these two members so that a lateral adjustment of the angularly bent portion of the plate may be obtained. Accordingly, this portion may be located as desired with respect to the stream of flakes produced by knives 22 and exhausted through conduit 28. Since the heavier flakes and any sticks or slivers which may be present follow a path more nearly tangent to cutter head 20 than that followed by the lighted flakes which are more easily sucked into conduit 28, plate 32 achieves a fractionation of the woody product into accepted and rejected fractions.

The feeding apparatus which feeds random thickness wood blocks to cutter head 20 and holds them down while the knives reduce them to flakes is mounted on a frame including posts 40, 42; spaced, horizontally-extending, longitudinal members 44, 46; transverse channel members 48, 50; and side frame member 52 mounted on the channel members. This frame carries the spaced, longitudinally-extending, side guide plates 54, 56, an end plate 58 at the infeed end of the apparatus, and an end plate 60 at the outfeed end of the apparatus. The latter plate cooperates with angularly bent plate 32 on the flaker assembly in defining a channel to be traversed by the rejected stick fraction of the flaked product in the manner described above.

The frame also supports an anvil 62 which extends in close proximity to cutter head 20 and which is provided with knives 64 designed to cooperate with knives 22 on the cutter head in producing clean cut flakes. Anvil 62 preferably is formed with spaced, inwardly extending projections or fingers 66 (Fig. 2) which are supported in part by transverse structural members 50 and which make possible efficient feeding of the wood blocks onto the body of the anvil.

The block conveying assembly

The conveying assembly whereby the wood blocks are conveyed onto anvil 62 and against cutter head 20 is driven by a motor, the shaft 68 of which drives gear box 70 (Fig. 2). A drive shaft 72 is coupled to the gear box and journaled in bearings 74 which are supported respectively on longitudinal frame members 46, 52.

A sprocket 76 is keyed to shaft 72 and drives a chain 78. This chain engages a sprocket 80 on a drive shaft 82 journaled in bearings 84 and driving an endless chain unit.

The latter unit includes a plurality of spaced sprockets 86 keyed to shaft 82 and each driving an endless chain 88. The chaines are provided with outwardly extending lugs 90 (Fig. 3) dimensioned to engage the wood blocks effectively. The upper or working stretch of each chain is backed up by a plate or bar 92.

At their infeed ends, chains 88 engage sprockets 94 which are rigid to an idler shaft 96. The outfeed ends of chains 88 extend into the spaces between anvil projections 66 and the upper stretches of the chains are substantially coplanar with the upper surfaces of these projections. Accordingly, wood blocks 98 may be placed on the infeed end of chains 88 crosswise thereof, i.e. with the grain direction of the blocks parallel to the cutting edges of knives 22 on flaker head 20. The blocks then will be carried across anvil projections 66 onto the body 62 of the anvil where they are reduced by the flaker head knives to wood flakes.

An upper conveying assembly cooperates with the lower assembly in advancing the blocks toward the flaker head. This assembly also is driven from gear box 70. The drive includes a sprocket 100 (Figs. 1 and 2) driven by drive shaft 72, a chain 102, a sprocket 104, and a drive shaft 106 to which the latter sprocket is fixed. This shaft is journaled in bearings 108 supported by posts 110.

The upper conveying unit floats in order that it may accommodate itself to blocks of varying thicknesses while still maintaining itself in a substantially horizontal plane so that it will engage the upper surfaces of all of the blocks. To this end, a pair of plates 12 braced and separated by hollow rod 114 are journaled on shaft 106. The plates in turn support a drive shaft 116 rotatably mounted in bearings 118. A gear 120 is affixed to the end of shaft 116 and meshes with a gear 122 affixed to shaft 106.

A plurality of spaced sprockets 123 also are keyed to shaft 116. These sprockets support drive chains 124 which preferably register with chains 88 in the lower drive unit. Each of these chains is housed between a pair of plates 126, the infeed ends of which are rotatably mounted on shaft 116. The outfeed end of each of these pairs of plates supports a stub shaft 128 which rotatably mounts a sprocket 130. Accordingly each of the upper drive chain units acts independently of the others at the outfeed end and can work at its own elevation as determined by the height of the irregular blocks 98 of wood which it engages while remaining substantially level at all times.

Means also are provided for applying a resilient force to the outfeed ends of the upper drive chain units so that they bear solidly against the wood blocks. The means employed for this purpose are illustrated particularly in Figs. 1 and 4.

Extending upwardly from frame members 44, 46 are a pair of vertical standards 134. These support a cross piece 136 and are formed with guideway 138. A fluid operated cylinder 140 is mounted on cross piece 136 by means of pin 142. The piston rod 144 of this cylinder is connected by pin 146 to tabs 148 extending upwardly from a cross head 150.

The ends of cross head 150 extend into guideways 138 and are provided with transverse rub pins 152 which serve to stabilize the cross head as it moves up and down in the guideways.

The cross head is connected to the chain assemblies by means of bolts 154 having enlarged lower ends 156. These bolts slide freely in the openings in the cross head in which they are seated. They are connected to plates 126 by means of connecting pins 158. A coil spring 160 is interposed between the cross head and the enlarged base 156 of each bolt.

Accordingly, when the piston rod 144 of cylinder 140 is extended, chains 124 are lowered until they engage the upper surfaces of wood blocks 98. Continued extension of the piston rod compresses springs 160 until they are substantially compressed. As the blocks are driven forwardly by the chains, springs 160 act to force individual ones of the chains downwardly when a depression appears in the block immediately below it. In this way each of the chains is in engagement with the blocks at all times so that a positive drive is obtained.

*The block hold down assembly*

A block hold down assembly is provided to cooperate with the above described conveying chain units in holding the blocks down immediately adjacent flaking head 20. The hold down unit is illustrated particularly in Figs. 1, 3 and 5.

The hold down members are supported on a plurality of laterally spaced apart arms 170 which are interleaved with the upper drive chain assemblies. These arms act independently of each other and the upper end of each is provided with a longitudinal slot 172 by means of which it is connected to a shaft 174 supported by posts 110. Spacing collars 176 maintain the arms properly spaced from each other.

A pair of parallel vertically arranged plates 178 is welded to the outfeed ends of arms 170. Hold down shoes 180 are welded between the bottom margins of the plates. The forward margins of the shoes are slightly bent so that they lie in a substantially horizontal plane better to engage the upper surfaces of blocks 98. The extreme outfeed edges of the shoes lie in close proximity to flaking rotor 20 and maintains this proximity over the entire range of angular movement of arms 170.

To accomplish this purpose, a wrist pin 182 is journaled between each pair of the plates. One end of a connecting link 184 is clamped to the wrist pin while the other end of the link rotates about a fixed shaft 186 mounted in clamps 187. Hence as shoes 180 follow the irregular surfaces of blocks 98 links 184 rotate about shaft 186 and the slotted ends of arms 170 slide on shaft 174 with the result that the tip ends of the shoes, during the limited arc which they travel, follow a path which is substantially concentric with shaft 16 of the flaker head 20 and therefore retain their degree of proximity to the periphery thereof.

To maintain shoes 180 bearing against the wood blocks while at the same time permitting them to act independently of each other to follow contour irregularities of the blocks, an assembly is provided which is illustrated particularly in Figs. 1 and 5. This assembly is somewhat similar to that driven by cylinder 140 of the upper chain assembly and is mounted on a frame including posts 190 and cross piece 192. Posts 190, like posts 134, are provided with longitudinal guideways 194.

A fluid operated cylinder 196 is mounted centrally of cross piece 192 by means of pin 198. The piston rod 200 of the cylinder is connected through a pin 202 and clevis 204 to a cross head 206. The ends of the cross head extend into and slide in guideways 194, cross pins 208 being provided to stabilize the cross head during its movement.

The cross head is connected to the spaced pressing shoe assemblies by means of resilient linkages each of which includes a bolt 210 which slides in an opening through the cross head and is held in place with nut 212. The lower end 214 of each bolt lies between upwardly extending projections of plates 178 and is held there by a pin 216.

Compression springs 220 are wrapped around bolts 210. Hence when the piston rod 200 of cylinder 196 is extended, shoes 180 are pressed against the upper surfaces of blocks 98 and springs 220 are substantially compressed. Then as the shoes ride over the irregular surfaces of the blocks, they follow the surface contour independently, being forced downwardly by the springs when a depression is encountered, and being elevated against the force of the springs when an elevation is met.

Operation

The operation of the presently described feeding apparatus is as follows:

Flaking head 20 is set in motion at a constant and predetermined rotational speed and blocks 98 of random thickness are placed side by side on lower drive chains 88. The drive chains are driven synchronously through gear box 70 and advance the blocks against the flaking head. As the blocks advance, the upper chains which pivot about shafts 106, 116 are maintained in a constantly horizontal position, but float upwardly and downwardly independently of each other at the outfeed end as required to maintain engagement with the wood blocks. As they move, they are maintained firmly against the blocks by the action of fluid operated cylinder 140 which actuates cross head 150, moving it downwardly until the chains are firmly in contact with the wood blocks and springs 160 are under compression. As the chains raise and lower, they work against these springs and accordingly are continuously pressed against the blocks.

As the blocks are reduced by the flaking head, they are clamped tightly in position until their trailing ends have been reduced substantially completely to flakes by the action of pressing shoes 180. These are pressed downwardly by the action of cylinder 196 and cooperating springs 210 in a manner similar to that just described in connection with the action of cylinder 140. Being supported by slotted arms 170 at one end and by rotatable links 184 at the other end, they move in arcuate paths to follow the contour of the block surfaces, maintaining shoes 180 substantially equi-distant from the periphery of the flaker head at all times.

The flakes produced pass in a continuous stream downwardly into the chamber formed by hood members 24, 26 and are exhausted by the fan communicating with conduit 28. Any sticks or unduly large pieces which may be formed may be fractionated out by suitable adjustment of angularly bent plate 32.

As a result, there are produced flakes of uniform controlled dimensions which are well suited for use in the manufacture of various composite wood products. The flakes may be produced, furthermore, at a very high production rate from non-uniform wood blocks of random thickness.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. Apparatus for feeding wood blocks to the circumferential cutting surface of a rotary wood flaker, comprising a frame, lower conveying means mounted on the frame, upper conveying means arranged vertically above the lower conveying means and cooperating with the latter in conveying against the flaker wood blocks introduced between and engaged by the upper and lower conveying means, a plurality of laterally spaced block hold down members each having an elongated arm mounted at one end on the frame adjacent the infeed end thereof for pivotal and longitudinal movement and each supporting at its opposite end a block hold down shoe member arranged adjacent the flaker, and link means mounted pivotally on the frame adjacent the flaker and pivotally interconnecting the shoe members and frame for guiding the movement of the shoe members independently of each other arcuately and substantially concentric with the rotary flaker to maintain a substantially uniform proximity between the shoe members and the periphery of the flaker.

2. The apparatus of claim 1 including resilient hold down means mounted on the frame and engaging each of the hold down members for urging the hold down shoe members downward independently of each other against the wood blocks.

3. Apparatus for feeding wood blocks to a rotary wood flaker, comprising a frame, lower conveying means mounted on the frame, a plurality of independent laterally spaced upper conveying means arranged above the lower conveying means and cooperating with the latter in conveying against the flaker wood blocks introduced between and engaged by the upper and lower conveying means, pivot means supporting the infeed end of the plurality of upper conveying means, the outfeed ends of the plurality of upper conveying means being vertically movable independent of each other, and pivot support means mounted pivotally on the frame adjacent the infeed end thereof and supporting the pivot means and the infeed end of the upper conveying means supported thereby for floating movement to accommodate wood blocks of random thicknesses.

4. The apparatus of claim 3 including resilient hold down means mounted on the frame and engaging each of the upper conveying means for urging the latter downward independently of each other against the wood blocks.

5. Apparatus for feeding wood blocks to the circumferential cutting surface of a rotary wood flaker, comprising a frame, lower conveying means mounted on a frame, a plurality of independent laterally spaced upper conveying means arranged above the lower conveying means and cooperating with the latter in conveying against the flaker wood blocks introduced between and engaged by the upper and lower conveying means, pivot means supporting the infeed end of the plurality of upper conveying means, the outfeed ends of the plurality of the upper conveying means being vertically movable independent of each other, pivot support means mounted pivotally on the frame adjacent the infeed end thereof and supporting the pivot means and the infeed end of the upper conveying means supported thereby for floating movement to accommodate wood blocks of random thicknesses, a plurality of laterally spaced block hold down shoe members arranged adjacent the flaker, and support means on the frame supporting the hold down shoe members for independent movement through their range substantially concentric with the rotary flaker to maintain a substantially uniform proximity between the shoe members and the periphery of the flaker.

6. The apparatus of claim 5 including resilient hold down means mounted on the frame and engaging each of the upper conveying means for urging the latter downward independently of each other against the wood blocks, and resilient hold down means mounted on the frame and engaging each of the shoe members for urging the latter downward independently of each other against the wood blocks.

7. Apparatus for feeding wood blocks to the circumferential cutting surface of a rotary wood flaker, comprising a frame, lower conveying means mounted on the frame, a plurality of independent laterally spaced upper conveying means arranged above the lower conveying means and cooperating with the latter in conveying against the flaker wood blocks introduced between and engaged by the upper and lower conveying means, pivot means supporting the infeed end of the plurality of upper conveying means, the outfeed ends of the plurality of upper conveying means being vertically movable independent of each other, pivot support means mounted pivotally on the frame adjacent the infeed end thereof and supporting the pivot means and the infeed end of the upper conveying means supported thereby for floating movement to accommodate wood blocks of random thicknesses, a plurality of laterally spaced block hold down members each having an elongated arm mounted at one end on the frame adjacent the infeed end thereof for pivotal and longitudinal movement and each supporting at its opposite end a block hold down shoe member arranged adjacent the flaker, and link means mounted pivotally on the frame adjacent the flaker and pivotally interconnecting the shoe members and frame for guiding the movement of the shoe members independently of each other arcuately and substantially concentric with the rotary flaker to maintain a substantially uniform proximity between the shoe members and the periphery of the flaker.

8. The apparatus of claim 7 including resilient hold down means mounted on the frame and engaging each of the upper conveying means for urging the latter downward independently of each other against the wood blocks, and resilient hold down means mounted on the frame and engaging each of the block hold down members for urging the hold down shoe members downward independently of each other against the wood blocks.

9. In combination, a rotary wood flaker having a circumferential cutting surface, anvil means adjacent the flaker and defining the outfeed of the latter, a hood encasing the flaker and having an air inlet opening therein disposed in the outfeed direction of the flaker and in a plane substantially tangent to the circumferential cutting surface at said outfeed, and a source of vacuum communicating with the hood for creating an air flow inwardly through said air inlet opening.

10. The combination of claim 9 including an adjustable plate on the hood for adjusting the air inlet opening in the hood for controlling the air flow therethrough for the fractionation of the lighter and heavier flakes, the lighter flakes being carried with the air flow and the heavier flakes being ejected tangentially from the flaker through said air inlet opening.

References Cited in the file of this patent

UNITED STATES PATENTS

| | | |
|---|---|---|
| 227,316 | Stover | May 4, 1880 |
| 1,538,066 | Street | May 19, 1925 |
| 2,564,904 | Jacobson | Aug. 21, 1951 |
| 2,570,926 | Elmendorf | Oct. 9, 1951 |
| 2,616,501 | Smith | Nov. 4, 1952 |
| 2,652,077 | Alexander | Sept. 15, 1953 |
| 2,796,093 | Mottet | June 18, 1957 |
| 2,811,183 | Mottet | Oct. 29, 1957 |
| 2,822,003 | McCahon et al. | Feb. 4, 1958 |
| 2,863,476 | Clark | Dec. 9, 1958 |

FOREIGN PATENTS

| | | |
|---|---|---|
| 101,625 | Sweden | May 20, 1941 |
| 138,901 | Austria | Oct. 10, 1934 |